US009705788B2

(12) United States Patent
Gao

(10) Patent No.: US 9,705,788 B2
(45) Date of Patent: Jul. 11, 2017

(54) PROVIDER EDGE IN VIRTUAL PRIVATE LAN SERVICE NETWORK

(71) Applicant: Hewlett Packard Enterprise Development LP, Houston, TX (US)

(72) Inventor: Zhonghua Gao, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/768,971

(22) PCT Filed: Apr. 15, 2014

(86) PCT No.: PCT/CN2014/075359
§ 371 (c)(1),
(2) Date: Aug. 19, 2015

(87) PCT Pub. No.: WO2014/169801
PCT Pub. Date: Oct. 23, 2014

(65) Prior Publication Data
US 2016/0028621 A1 Jan. 28, 2016

(30) Foreign Application Priority Data

Apr. 15, 2013 (CN) .......................... 2013 1 0129695

(51) Int. Cl.
*H04L 12/753* (2013.01)
*H04L 12/46* (2006.01)
(Continued)

(52) U.S. Cl.
CPC .......... *H04L 45/48* (2013.01); *H04L 12/4641* (2013.01); *H04L 45/02* (2013.01); *H04L 45/74* (2013.01); *H04L 63/0272* (2013.01)

(58) Field of Classification Search
CPC .. H04L 12/4641; H04L 45/02; H04L 63/0272
See application file for complete search history.

(56) References Cited

U.S. PATENT DOCUMENTS 8,953,590 B1 * 2/2015 Aggarwal ........... H04L 12/4675
370/389
2006/0109802 A1 5/2006 Zelig et al.
(Continued)

FOREIGN PATENT DOCUMENTS

CN 101584162 A 11/2009
CN 1960325 A 5/2010
(Continued)

OTHER PUBLICATIONS

International Search Report and Written Opinion dated Jun. 11, 2014 issued on PCT Patent Application No. PCT/CN2014/075359 dated Apr. 15, 2014, State Intellectual Property Office, P.R. China.
(Continued)

*Primary Examiner* — Siming Liu
(74) *Attorney, Agent, or Firm* — Hewlett Packard Enterprise Patent Department

(57) ABSTRACT

In a VPLS network, a first PE in a VPN instance sends topology information and a bridging MAC address of the first PE to another PE in the VPN instance, receives and stores topology information and bridging MAC addresses from the another PE. The first PE further generates a CE MAC table in the VPN instance according to the stored topology information and bridging MAC addresses of the another PE; calculates a unicast minimal spanning tree by taking the first PE as a root, generates a unicast MAC table in the VPN instance according to the unicast minimal spanning tree. Each PE further selects one of the PEs in the VPN instance as a root bridge, calculates a broadcast minimal spanning tree by taking the root bridge as a root, and generates a broadcast MAC table in the VPN instance according to the broadcast minimal spanning tree.

20 Claims, 7 Drawing Sheets

(51) Int. Cl.
*H04L 12/751* (2013.01)
*H04L 29/06* (2006.01)
*H04L 12/741* (2013.01)

(56) References Cited

U.S. PATENT DOCUMENTS

2006/0280131 A1* 12/2006 Rahman .................. H04L 45/02
370/256
2010/0111093 A1   5/2010 Satterlee et al.
2012/0134365 A1*  5/2012 Guo ........................ H04L 69/24
370/400

FOREIGN PATENT DOCUMENTS

CN    102255785    11/2011
CN    102546855     7/2012
CN    103200089     7/2013

OTHER PUBLICATIONS

M. Bocci, ED. and M. Vigoreux, ED., "MPLS Generic Associated Channel", RFC5586, Standards Track, Jun. 2009.
M. Bocci et al., "MPLS Generic Associated Channel," Jun. 2009, pp. 1-19, Network Working Group, Request for Comments: 5586, IETF Trust.
Marc Lasserre et al., "Virtual Private LAN Services over MPLS," Mar. 2003, pp. 1-26, Internet Draft Document, IETF.

* cited by examiner

PROVIDER EDGE IN VIRTUAL PRIVATE LAN SERVICE NETWORK

CLAIM FOR PRIORITY

The present application is a national stage filing under 35 U.S.C 371 of PCT application number PCT/CN2014/075359, having an international filing date of Apr. 15, 2014, which claims the benefit of priority from Chinese Patent Application, No. 201310129695.9, having a filing date of Apr. 15, 2013, the disclosures of which are hereby incorporated by reference in their entireties.

BACKGROUND

Along with the development of Internet technologies, Ethernet-based Layer2 Virtual Private Network (L2VPN) technologies are widely used. Virtual Private LAN Service (VPLS) technologies support one-to-multiple Media Access Control (MAC) forwarding.

In order to prevent loops caused by the MAC forwarding, some limitations are configured for the networking of the VPLS. For example, in a backbone network, full mesh connection of Pseudo wires (PWs) may be established among all Provider Edges (PEs). The PE accessing to the network may use Hierarchy of VPLS (H-VPLS) to prevent the rapid expansion of the full mesh connection scale.

DETAILED DESCRIPTION

The present disclosure will be illustrated in detail hereinafter with reference to the accompanying drawings and specific examples.

Figure 1:
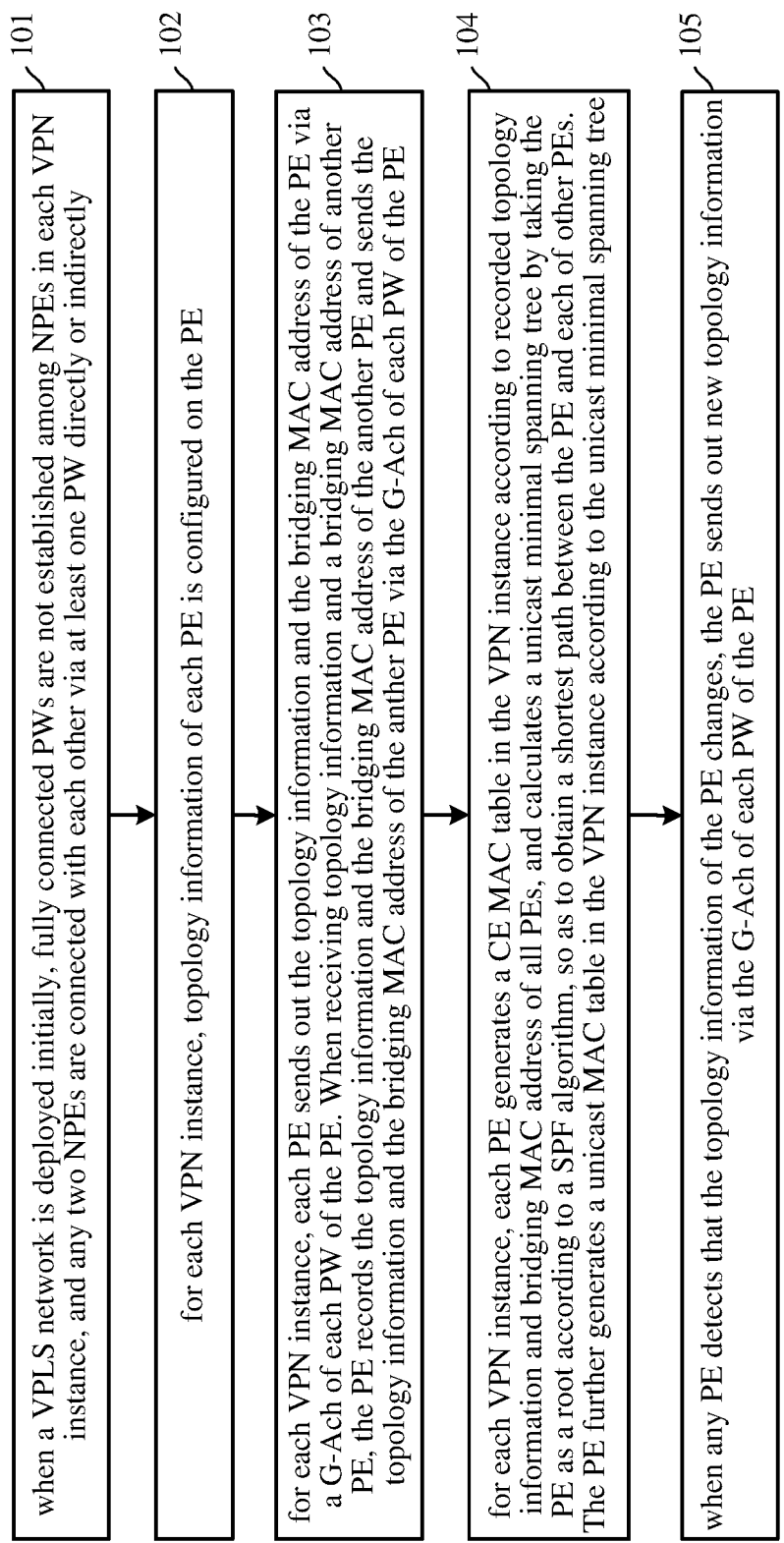
FIG. 1 is a schematic flowchart illustrating an example method.

FIG. 1 is a schematic flowchart illustrating an example method. As shown in FIG. 1, the method includes the following processing.

At 101, when a VPLS network is deployed initially, full mesh connection of PWs is not established among Network PEs (NPEs) in each VPN instance, and any two NPEs are connected with each other via at least one PW directly or indirectly.

Each PE has a bridging MAC address which is a unique identification of the PE.

Figure 2:
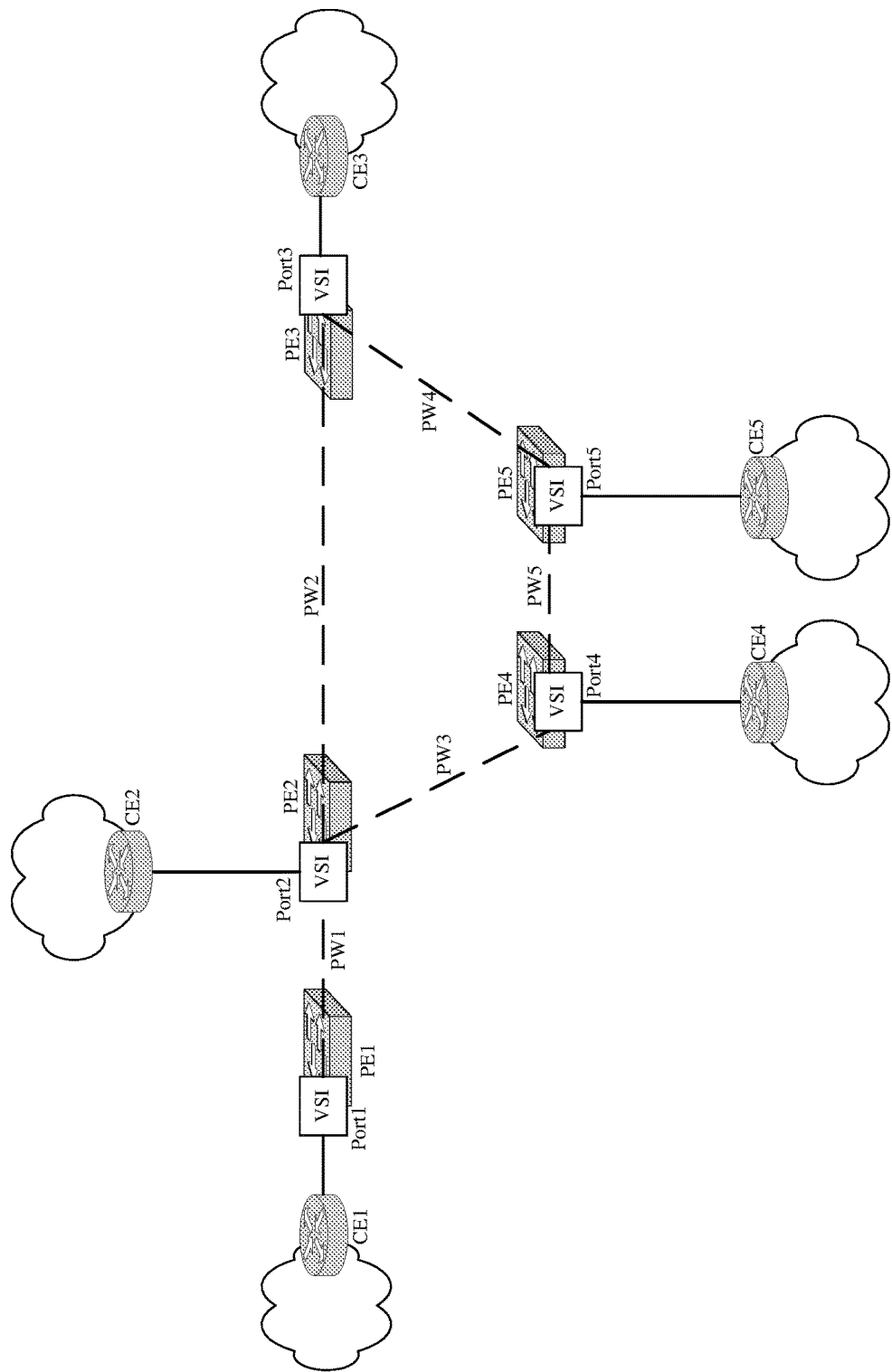
FIG. 2 is a schematic diagram illustrating an example networking of a VPLS network.
Figure 3:
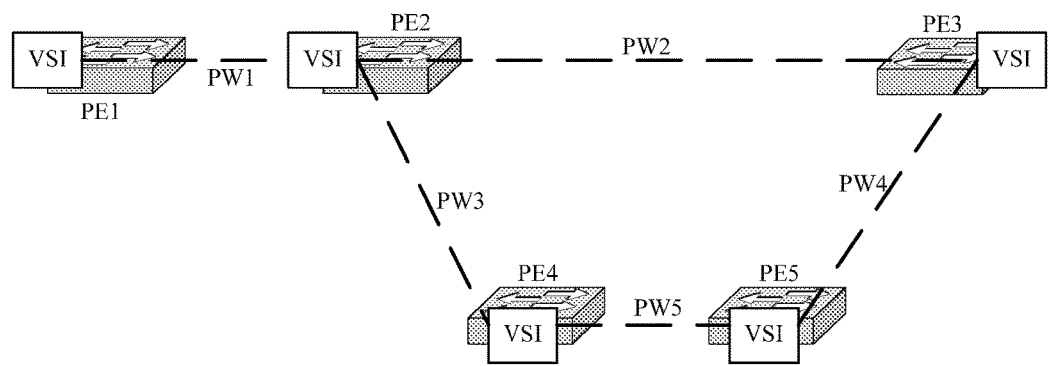
FIG. 3 is a schematic diagram illustrating an example unicast minimal spanning tree generated by a PE2 in FIG. 2.

FIG. 2 is a schematic diagram illustrating an example networking of a VPLS network. As shown in FIG. 2, full mesh connection of PWs is not established among NPE2~NPE5, and each two NPEs are connected with each other via at least one PW directly or indirectly.

It should be noted that, in processes of learning a unicast MAC table and a broadcast MAC table, a User-facing PE (UPE) has the same status as the NPE. Hence, in FIG. 2 and descriptions of the examples, the UPE and the NPE are not distinguished, and are both represent as the PE.

At 102, for each VPN instance, topology information of each PE is configured on the PE.

The topology information of the PE includes: an identifier of each PW of the PE, a metric and a bridging MAC address of an opposite PE of each PW, an MAC address of each Customer Edge (CE) connected with the PE, and a local interface identifier of the CE.

Although the topology information of the PE corresponding to different VPN instance may be different, the contents of the topology information of the PE corresponding to each VPN instance may be represented as: the identifier of each PW of the PE, the metric and the bridging MAC address of the opposite PE of each PW, the MAC address of each CE connected with the PE, and the local interface identifier of the CE. Therefore, the examples of the present disclosure may be applied to any VPN instance.

As shown in FIG. 2, a current VPN is VPN1, the metric of each PW is configured as 1, and the topology information configured on each PE is as follows.

The topology information of PE1 includes: PW1, a bridging MAC address of PE2.

The topology information of PE2 includes: PW1, a bridging MAC address of PE1; PW2, a bridging MAC address of PE3; PW3, a bridging MAC address of PE4; Port2, a MAC address of CE2.

The topology information of PE3 includes: PW2, a bridging MAC address of PE2; PW4, a bridging MAC address of PE5; Port3, a MAC address of CE3.

The topology information of PE4 includes: PW3, a bridging MAC address of PE2; PW5, a bridging MAC address of PE5; Port4, a MAC address of CE4.

The topology information of PE5 includes: PW4, a bridging MAC address of PE3; PW5, a bridging MAC address of PE4; Port5, a MAC address of CE5.

At 103, for each VPN instance, each PE sends out the topology information and the bridging MAC address of the PE via a Generic Associated Channel (G-Ach) of each PW of the PE. When receiving topology information and a bridging MAC address of another PE, the PE records the topology information and the bridging MAC address of the another PE and sends the topology information and the bridging MAC address of the anther PE via the G-Ach of each PW of the PE.

At 104, for each VPN instance, each PE generates a CE MAC table in the VPN instance according to recorded topology information and bridging MAC address of all PEs, and calculates a unicast minimal spanning tree by taking the PE as a root according to a Short Path First (SPF) algorithm, so as to obtain a shortest path between the PE and each of other PEs. The PE further generates a unicast MAC table in the VPN instance according to the unicast minimal spanning tree.

In addition, each PE selects one PE as a root bridge according to a spanning tree protocol algorithm, calculates a broadcast minimal spanning tree by taking the root bridge as a root, and generates a broadcast MAC table in the VPN instance according to the broadcast minimal spanning tree. The topology information and the bridging MAC addresses of the PEs are transmitted among the PEs via the G-Aches of the PWs. Hence, according to the examples of the present disclosure, the minimal spanning tree protocol used in the VPLS network is one of PW in band protocols, in which the unicast MAC table and the broadcast MAC table are calculate by taking the PWs as logic links and taking Attachment Circuits (AC) and PWs as logic interfaces.

The principle for selecting the root bridge may be configured in advance. For example, the PE having the minimum bridging MAC address may be taken as the root bridge, or the PE having a highest configuration priority may be taken as the root bridge.

The unicast minimal spanning tree is an equivalent minimal spanning tree. When there are multiple shortest paths between two nodes, the multiple shortest paths may be remained as equivalent paths. The broadcast minimal spanning tree is nonequivalent minimal spanning tree. When there are multiple shortest paths between two nodes, only one of the multiple shortest paths may be remained.

The item of the unicast MAC table includes a bridging MAC address of a destination PE, and egress port information. The egress port information may be a PW identifier.

The item of the broadcast MAC table includes a node, a node type, and forwarding egress port information.

The node refers to each node in the broadcast minimal spanning tree, and one PE is one node.

The node type includes a root node, a middle node and a leaf node.

The forwarding egress port information refers to forwarding egress port information when the node receives a broadcast packet, a multicast packet or a unknown unicast packet. The forwarding egress port information is represented by at least one of an identifier of a PW and a local interface identifier of a CE.

The item of the CE MAC table includes a MAC address of a CE and information of a destination PE.

The MAC address of the CE may be a MAC address of each CE in the VPN instance.

When the CE is a remote CE, the information of the destination PE is a MAC address of a PE connected with the CE. When the CE is a local CE, the information of the destination PE is a local interface identifier of a PE connected with the CE. As shown in FIG. 2, PE2 calculates a unicast minimal spanning tree for VPN1 by taking PE2 as the root according to the SPF algorithm. The unicast MAC table in VPN1 generated by PE2 is shown in table 1.

TABLE 1 unicast MAC table in VPN1 generated by PE2

| bridging MAC address of PE | egress port information |
| --- | --- |
| bridging MAC address of PE1 | PW1 |
| bridging MAC address of PE3 | PW2 |
| bridging MAC address of PE4 | PW3 |
| bridging MAC address of PE5 | PW, PW3 (equivalent) |

Figure 4:
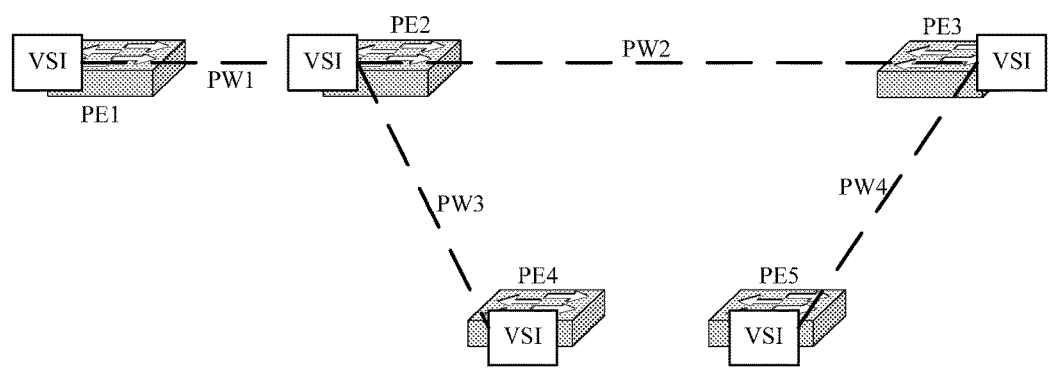
FIG. 4 is a schematic diagram illustrating an example broadcast minimal spanning tree generated by a PE2 in FIG. 2.

According to the spanning tree protocol algorithm, the root bridge selected by PE2 is PE3, and the calculated broadcast minimal spanning tree is shown in FIG. 4. The broadcast MAC table in VPN1 generated by PE2 is shown in table 2.

TABLE 2 broadcast MAC table in VPN1 generated by PE2

| node | node type | forwarding egress port information |
| --- | --- | --- |
| bridging MAC address of PE3 | root node | PW4, PW2, Port3 |
| bridging MAC address of PE2 | middle node | PW1, PW3, Port2 |
| bridging MAC address of PE1 | leaf node | Port1 |
| bridging MAC address of PE4 | leaf node | Port4 |
| bridging MAC address of PE5 | leaf node | Port5 |

The CE MAC table in VPN1 generated by PE2 is shown in table 3.

TABLE 3

CE MAC table in VPN1 generated by PE2

| MAC address of CE | Information of the destination PE |
| --- | --- |
| MAC address of CE1 | bridging MAC address of PE1 |
| MAC address of CE2 | Port2 |
| MAC address of CE3 | bridging MAC address of PE3 |
| MAC address of CE4 | bridging MAC address of PE4 |
| MAC address of CE5 | bridging MAC address of PE5 |

At 105, for any Virtual Switched Instance (VSI), when any PE detects that the topology information of the PE changes, the PE sends out new topology information via the G-Ach of each PW of the PE.

In this case, each PE may learn new unicast MAC table and new broadcast MAC table according to the spanning tree protocol algorithm. If necessary, the PE may learn the CE MAC table again.

As can be seen from the example shown in FIG. 1, when any PW fails, each PE may learns the unicast MAC table, the broadcast MAC table and the CE MAC table of each VPN instance according to the processing at 103 and 104. In this case, at 103, the topology information released by each PE does not include the information of the failed PW, e.g. the identifier of the PW, the metric and the bridging MAC address of the opposite PE.

When a new NPE device is added to the VPLS network, the new NPE device does not need to establish full mesh connection with existing NPE devices. The new NPE device may be connected with one existing NPE device via a PW. The new NPE device and the existing NPE devices send out the new topology information via the G-Ach of each PW, and each PE learns the unicast MAC table and the broadcast MAC table again.

Figure 5:
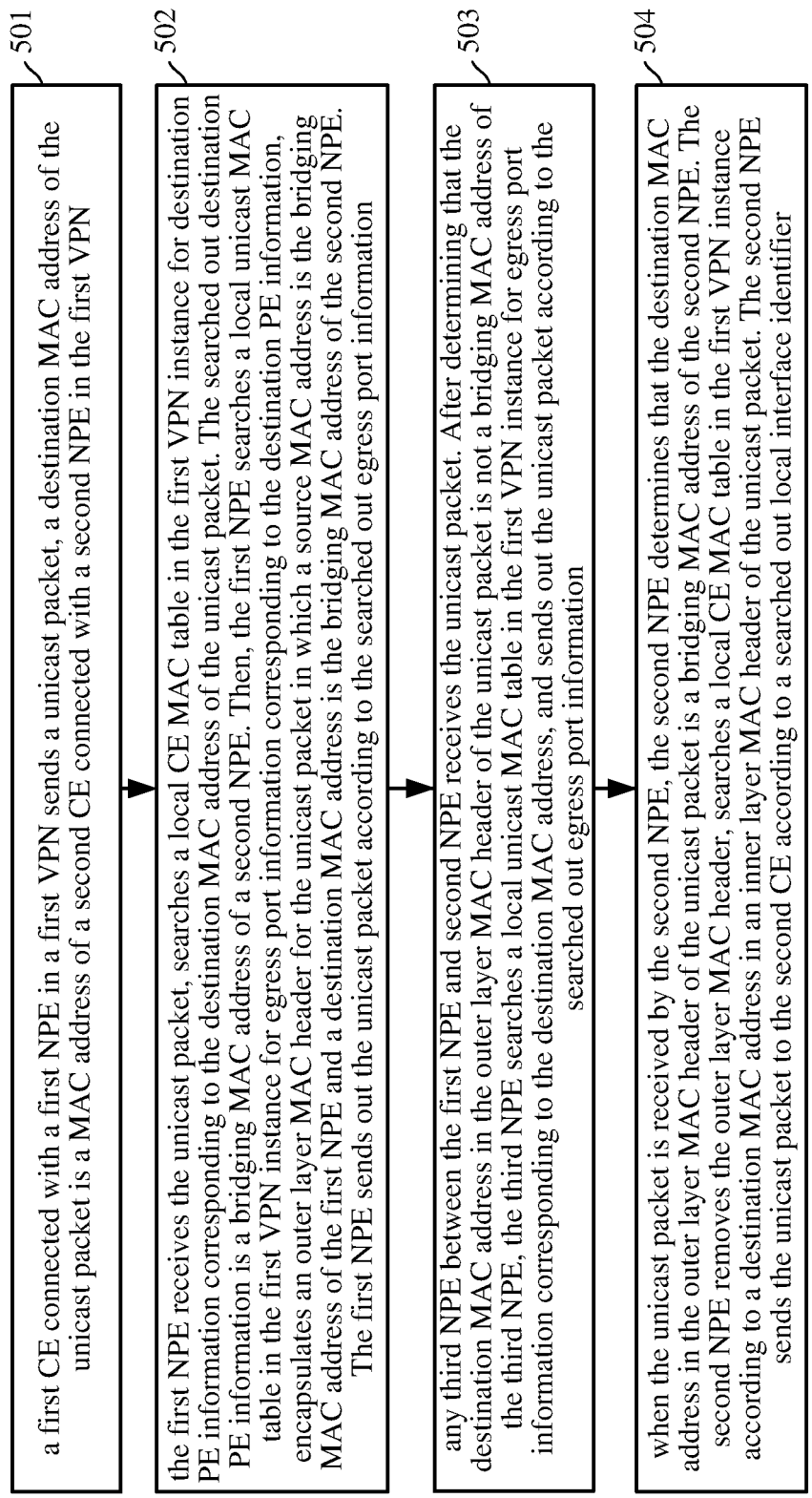
FIG. 5 is a schematic flowchart illustrating an example method for transmitting a unicast packet in a VPLS network.

FIG. 5 is a schematic flowchart illustrating an example method for transmitting a unicast packet in a VPLS network. As shown in FIG. 5, the method includes the following processing.

At 501, a first CE connected with a first NPE in a first VPN sends a unicast packet, a destination MAC address of the unicast packet is a MAC address of a second CE connected with a second NPE in the first VPN.

At 502, the first NPE receives the unicast packet, searches a local CE MAC table in the first VPN instance for destination PE information corresponding to the destination MAC address of the unicast packet. In the example, the searched out destination PE information is a bridging MAC address of a second NPE. Then, the first NPE searches a local unicast MAC table in the first VPN instance for egress port information corresponding to the destination PE information, encapsulates an outer layer MAC header for the unicast packet in which a source MAC address is the bridging MAC address of the first NPE and a destination MAC address is the searched out destination PE information, i.e. the bridging MAC address of the second NPE. The first NPE sends out the unicast packet according to the searched out egress port information.

At 503, any third NPE between the first NPE and second NPE receives the unicast packet. After determining that the destination MAC address in the outer layer MAC header of the unicast packet is not a bridging MAC address of the third NPE, the third NPE searches a local unicast MAC table in the first VPN instance for egress port information corresponding to the destination MAC address, and sends out the unicast packet according to the searched out egress port information.

At 504, when the unicast packet is received by the second NPE, the second NPE determines that the destination MAC address in the outer layer MAC header of the unicast packet is a bridging MAC address of the second NPE. The second NPE removes the outer layer MAC header, searches a local CE MAC table in the first VPN instance according to an inner layer destination MAC address of the unicast packet. The second NPE sends the unicast packet to the second CE according to a searched out local interface identifier.

As shown in FIG. 2, according to the example, when CE2 in VPN1 sends a packet to CE5, the procedure of forwarding the packet includes the following processing.

1) after receiving the packet, PE2 searches a local CE MAC table in VPN1, determines that a destination PE of CE5 is PE5. PE2 encapsulates the packet with an outer layer MAC header, and a source MAC address is a bridging MAC address of PE2, a destination MAC address is a bridging MAC address of PE5. PE2 searches a local unicast MAC table in VPN1, determines that an egress port corresponding to PE5 is PW2 and PW3. PE2 selects one PW, e.g. PW2, and sends out the packet from PW2.

Figure 6:
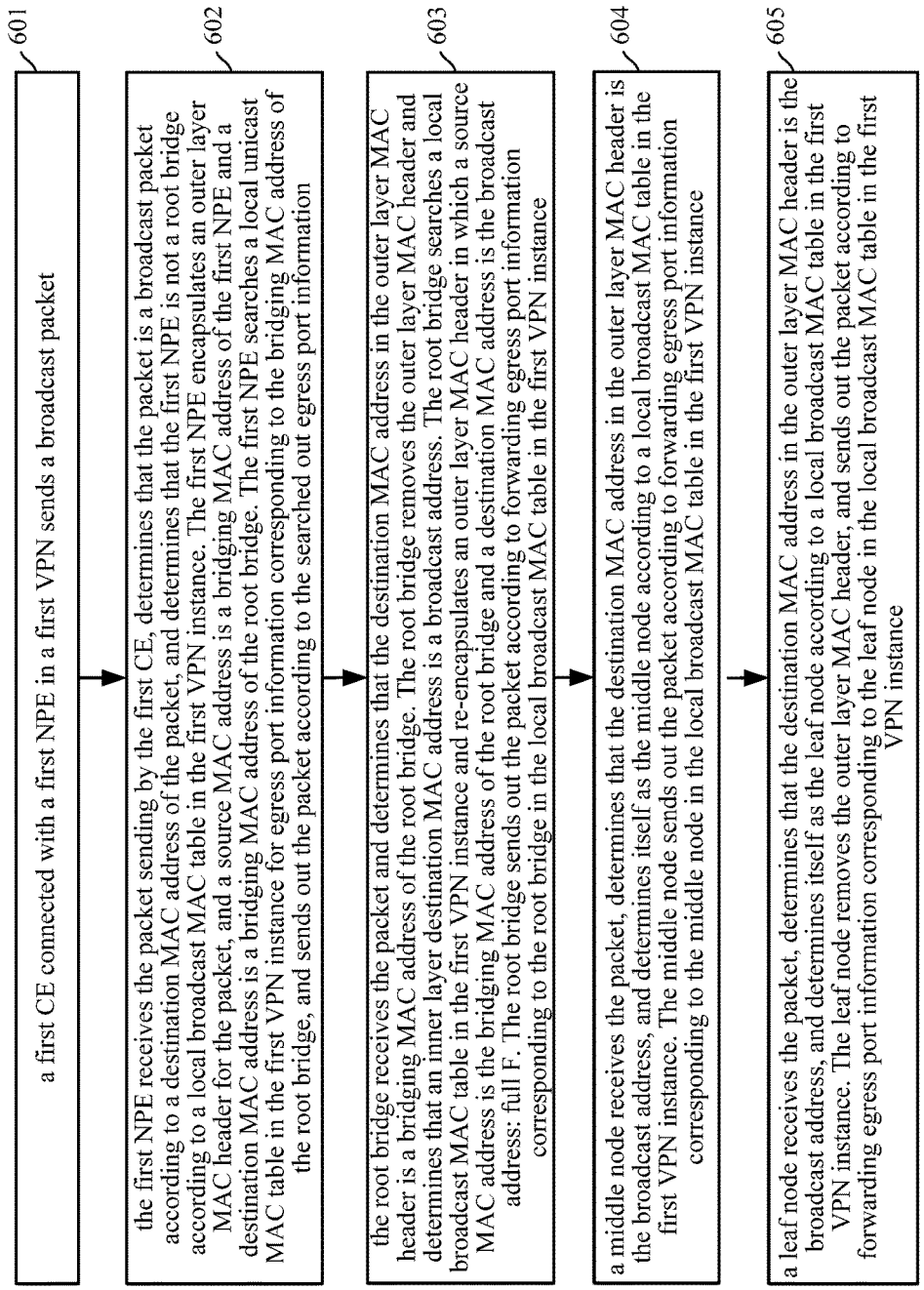
FIG. 6 is a schematic flowchart illustrating an example method for transmitting a broadcast packet in a VPLS network.

2) PE3 receives the packet via PW2, searches a local unicast MAC table in the VPN1 according to the destination MAC address in the outer layer MAC header, i.e. the bridging MAC address of PE5. The searched out egress port is PW4. PE3 sends the packet via PW4.3) PE5 receives the packet via PW4, determines that the destination MAC address in the outer layer MAC header is the bridging MAC address of PE5. PE5 removes the outer layer MAC header, searches a local CE MAC table in the first VPN instance according to an inner layer destination MAC address, i.e. the MAC address of CE5. The egress port searched out by PE5 is Port 5. PE5 sends the packet to CE5 via Port5. FIG. 6 is a schematic flowchart illustrating an example method for transmitting a broadcast packet in a VPLS network. As shown in FIG. 6, the method includes the following processing.

At 601, a first CE connected with a first NPE in a first VPN sends a broadcast packet.

At 602, the first NPE receives the packet sending by the first CE, determines that the packet is a broadcast packet according to a destination MAC address of the packet, and determines that the first NPE is not a root bridge according to a local broadcast MAC table in the first VPN instance. The first NPE encapsulates an outer layer MAC header for the packet, and a source MAC address is a bridging MAC address of the first NPE and a destination MAC address is a bridging MAC address of the root bridge. The first NPE searches a local unicast MAC table in the first VPN instance for egress port information corresponding to the bridging MAC address of the root bridge, and sends out the packet according to the searched out egress port information.

At 603, the root bridge receives the packet and determines that the destination MAC address in the outer layer MAC header is a bridging MAC address of the root bridge. The root bridge removes the outer layer MAC header and determines that an inner layer destination MAC address is a broadcast address. The root bridge searches a local broadcast MAC table in the first VPN instance and re-encapsulates an outer layer MAC header in which a source MAC address is the bridging MAC address of the root bridge and a destination MAC address is the broadcast address: full F. The root bridge sends out the packet according to forwarding egress port information corresponding to the root bridge in the local broadcast MAC table in the first VPN instance.

If a CE is connected with the root bridge, the forwarding egress port information searched out from the local broadcast MAC table in the first VPN instance includes a local interface. The root bridge needs to send out the original broadcast packet via each local interface.

At 604, a middle node receives the packet, determines that the destination MAC address in the outer layer MAC header is the broadcast address, and determines itself as the middle node according to a local broadcast MAC table in the first VPN instance. The middle node sends out the packet according to forwarding egress port information corresponding to the middle node in the local broadcast MAC table in the first VPN instance.

If a CE is connected with the middle node, the forwarding egress port information searched out from the local broadcast MAC table in the first VPN instance includes a local interface. The middle node needs to send out the original broadcast packet via each local interface.

At 605, a leaf node receives the packet, determines that the destination MAC address in the outer layer MAC header is the broadcast address, and determines itself as the leaf node according to a local broadcast MAC table in the first VPN instance. The leaf node removes the outer layer MAC header, and sends out the packet according to forwarding egress port information corresponding to the leaf node in the local broadcast MAC table in the first VPN instance.

The procedure of forwarding a multicast packet or a unknown unicast packet is similar with that of forwarding the broadcast packet which is not described herein.

As shown in FIG. 2, according to the example, when CE2 in VPN1 sends a broadcast packet to CE5, the procedure of forwarding the broadcast packet includes the following processing. 1) after receiving the packet, PE2 determines that the packet is a broadcast packet. PE2 searches a local broadcast MAC table in VPN1, and determines PE3 as a root bridge. PE2 encapsulates an outer layer MAC header for the packet in which a source MAC address is a bridging MAC address of PE2 and a destination MAC address is a bridging MAC address of PE3. PE2 searches a local unicast MAC table in VPN1, and a searched out egress port corresponding to PE3 is PW2. PE2 sends out the packet via PW2. 2) PE3 receives the packet via PW2, and determines that the destination MAC address in the outer layer MAC header of the packet is the bridging MAC address of PE3. PE3 removes the outer layer MAC header, and determines an inner layer destination MAC address is a broadcast address. PE3 searches a local broadcast MAC table in VPN1 for a forwarding egress port corresponding to PE3. The searched out forwarding egress port includes PW4, PW2 and Port5. PE3 obtains two additional copies of the packet. PE3 sends one copy of the packet from Port5. PE3 re-encapsulates an outer layer MAC header for two copies of the packet, a source MAC address is the bridging MAC address of the root bridge and a destination MAC address is the broadcast address: full F. PE3 sends the two copies of the packet via PW4 and PW2 respectively.

3) PE5 receives the packet via PW4, determines that the destination MAC address in the outer layer MAC header of the packet is the broadcast address, and determines that PE5 is a leaf node. PE5 removes the outer layer MAC header, searches a local broadcast MAC table in VPN1 for a forwarding egress port corresponding to PE5, and Port5 is searched out. PE5 sends the packet via Port1.

PE2 receives the packet via PW2, determines that the destination MAC address in the outer layer MAC header of the packet is the broadcast address, and determines that PE2 is a middle node. PE2 searches a local broadcast MAC table in VPN1 for a forwarding egress port corresponding to PE2, and PW1, PW3 and Port2 are searched out. PE2 obtains two additional copies of the packet. PE2 sends two copies of the packet via PW1 and PW3 respectively, and sends another copy of the packet from Port2 after removing the outer MAC header of the packet. 4) PE1 receives the packet via PW1, determines that the destination MAC address in the outer layer MAC header of the packet is the broadcast address, and determines that PE1 is a leaf node. PE1 removes the outer layer MAC header, searches a local broadcast MAC table in VPN1 for a forwarding egress port corresponding to PE1, and Port1 is searched out. PE1 sends the packet via Port1.

PE4 receives the packet via PW3, determines that the destination MAC address in the outer layer MAC header of the packet is the broadcast address, and determines PE4 is a leaf node. PE4 removes the outer layer MAC header, searches a local broadcast MAC table in VPN1 for a forwarding egress port corresponding to PE4, and Port4 is searched out. PE4 sends the packet via Port4. According to examples of the present disclosure, it is unnecessary to establish the full mesh connection of PWs between the NPEs in the VPLS network, thereby reducing networking complexity, making the network topology more flexible, and implementing traffic load sharing. In addition, the spanning tree protocol is running based on G-Ach without a control plane. Moreover, when the PW fails, a convergence forwarding path may be re-calculated by using the spanning tree protocol, thereby prevent traffic interruption.

Figure 7:
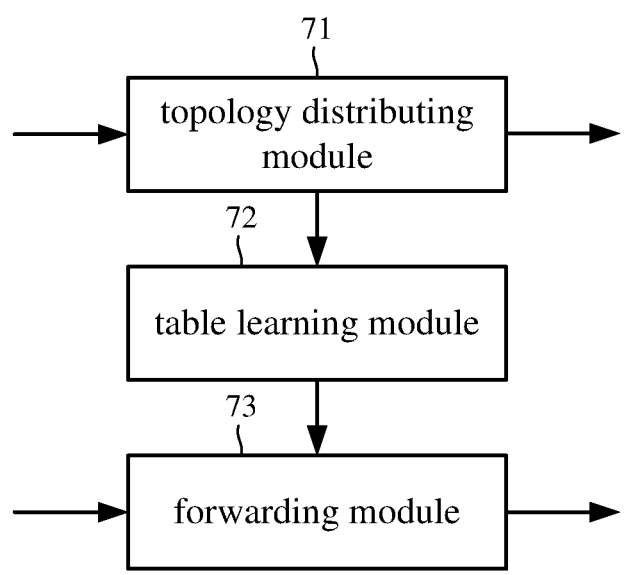
FIG. 7 is a schematic diagram illustrating an example PE in a VPLS network.

FIG. 7 is a schematic diagram illustrating an example PE in a VPLS network. When the PE is the NPE, the PE may arrive at other NPEs directly or indirectly via PWs. As shown in FIG. 7, the PE mainly includes a topology distributing module 71, a table learning module 72 and a forwarding module 73. For each VPN instance, the topology distributing module 71 sends topology information and a bridging MAC address of the PE via a G-Ach of each PW of the PE. The topology information includes an identifier of each PW of the PE, a metric and a bridging MAC address of an opposite PE of each PW, an MAC address of each CE connected with the PE, and a local interface identifier of the CE.

When receiving topology information and a bridging MAC address of another PE, the topology distributing module 71 records the topology information and the bridging MAC address of the another PE and sends the topology information and the bridging MAC address of the anther PE via the G-Ach of each PW of the PE.

When it is detected that the topology information of the PE changes, the topology distributing module 71 sends new topology information via the G-Ach of each PW of the PE.

For each VPN instance, the table learning module 72 generates a CE MAC table in the VPN instance according to the topology information and the bridging MAC addresses of all PEs stored by the topology distributing module 71. The table learning module 72 calculates a unicast minimal spanning tree by taking the PE as a root according to a SPF algorithm, and generates a unicast MAC table in the VPN instance according to the unicast minimal spanning tree. Further, the table learning module 72 selects one PE as a root bridge according to a spanning tree protocol algorithm, calculates a broadcast minimal spanning tree by taking the root bridge as a root, and generates a broadcast MAC table in the VPN instance according to the broadcast minimal spanning tree.

According to an example, an item of the unicast MAC table includes a bridging MAC address of a destination PE, and egress port information. An item of the broadcast MAC table includes a node, a node type, and forwarding egress port information. An item of the CE MAC table includes a MAC address of a CE, a bridging MAC address of a destination PE or a local interface identifier.

When receiving a unicast packet from a first CE connected with the PE in a first VPN instance, the forwarding module 73 searches a CE MAC table in the first VPN instance stored by the table learning module 72 for a bridging MAC address of a destination PE corresponding to a destination MAC address in the unicast packet. The forwarding module 73 further searches a unicast MAC table in the first VPN instance stored by the table learning module 72 for egress port information corresponding to the bridging MAC address of the destination PE. The forwarding module 73 encapsulates an outer layer MAC header for the unicast packet, a destination MAC address is the bridging MAC address of the destination PE. The forwarding module 73 sends the unicast packet according to the egress port information corresponding to the bridging MAC address of the destination PE;

When receiving the unicast packet in the first VPN and determining that the destination MAC address in the outer layer MAC header of the unicast packet is not a bridging MAC address of the PE, the forwarding module 73 searches a unicast MAC table in the first VPN instance stored by the table learning module 72 for egress port information corresponding to the destination MAC address, and send the unicast packet according to the egress port information corresponding to the destination MAC address.

When receiving the unicast packet in the first VPN instance and determining that the destination MAC address in the outer layer MAC header of the unicast packet is a bridging MAC address of the PE, the forwarding module 73 removes the outer layer MAC header of the unicast packet, and searches a CE MAC table in the first VPN instance stored by the table learning module 72 according to an inner layer destination MAC address. The forwarding module 73 further sends the unicast packet according to a local interface identifier searched out from the table learning module.

When a packet from a first CE connected with the PE in a first VPN instance is received and it is determined the packet is a broadcast packet, a multicast packet or an unknown unicast packet, if it is determined that the PE is not a root bridge of a broadcast minimal spanning tree, the forwarding module 73 encapsulates an outer layer MAC header for the packet, a destination MAC address is a bridging MAC address of the root bridge. The forwarding module 73 further searches a unicast MAC table in the first VPN instance stored by the table learning module 72 for egress port information corresponding to the bridging MAC address of the root bridge, and sends the packet according to the egress port information corresponding to the bridging MAC address of the root bridge.

When receiving the packet via a PW and determining that the destination MAC address in the outer layer MAC header of the packet is a bridging MAC address of the second PE, the forwarding module 73 removes the outer layer MAC header, determines an inner layer destination MAC address is a broadcast address, a multicast address or an unknown unicast address, and determines the PE is the root bridge of the broadcast minimal spanning tree. the forwarding module 73 searches a broadcast MAC table in the first VPN instance stored by the table learning module 72, re-encapsulates an outer layer MAC header, and a destination MAC address is the broadcast address, the multicast address or the unknown unicast address. The forwarding module 73 further sends the packet according to forwarding egress port information corresponding to the root bridge in the broadcast MAC table in the first VPN instance stored by the table learning module 72.

When receiving the packet from a PW, and determining that the destination MAC address in the outer layer MAC header of the packet is the broadcast address, the multicast address or the unknown unicast address, and determining the PE is a middle node of the broadcast minimal spanning tree the forwarding module 73 sends the packet according to egress port information corresponding to the PE in a broadcast MAC table in the first VPN instance stored by the table learning module 72. when receiving the packet from a PW, determining that the destination MAC address in the outer layer MAC header of the packet is the broadcast address, the multicast address or the unknown unicast address, and determining the PE is a leaf node of the broadcast minimal spanning tree, the forwarding module 73 removes the outer layer MAC header, and sends the packet according to egress port information corresponding to the PE in a local broadcast MAC table in the first VPN instance stored by the table learning module 72.

Figure 8:
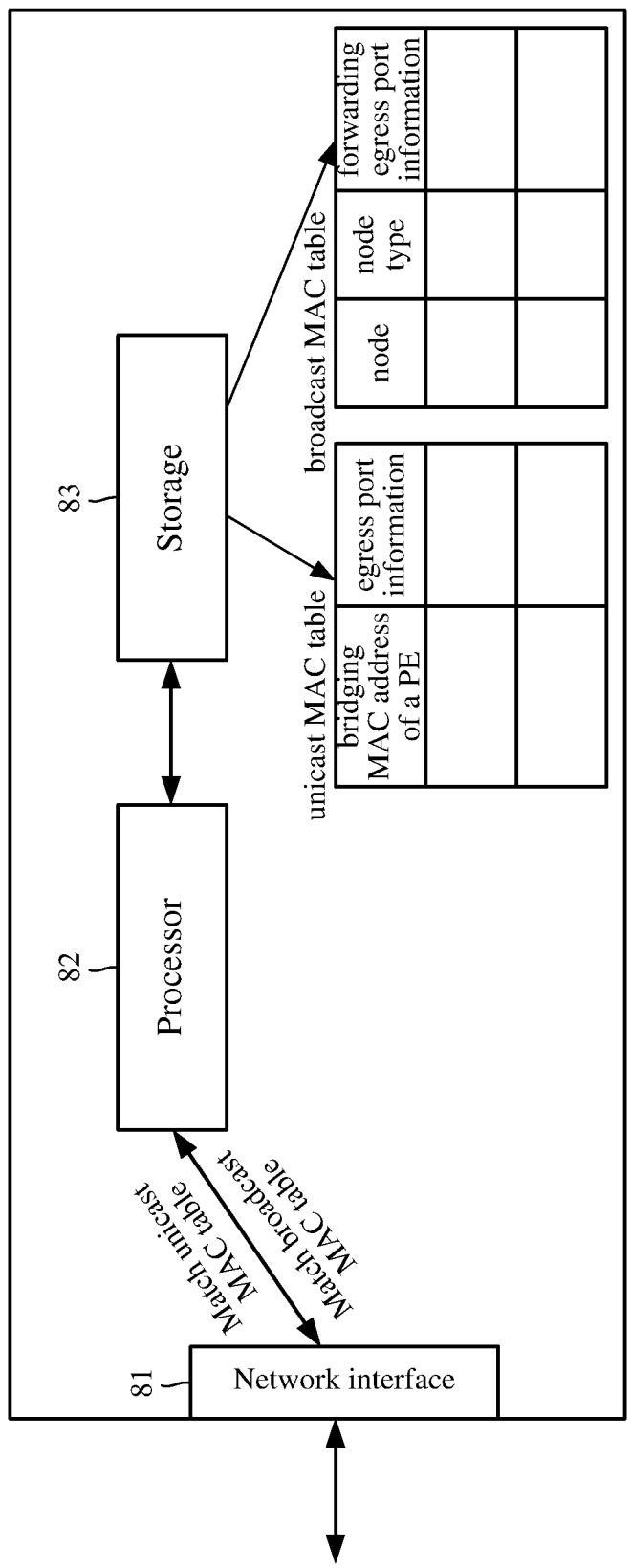
FIG. 8 is a schematic diagram illustrating another example PE in a VPLS network.

FIG. 8 is a schematic diagram illustrating another example PE in a VPLS network. As shown in FIG. 8, the PE mainly includes a network interface 81, a processor 82 and storage 83. The network interface 81 sends topology information and a bridging MAC address of the PE to other PEs in the VPN instance, and receives topology information and bridging MAC addresses from the other PEs.

The processor 82 communicates with the storage 83, and executes computer program codes.

The storage 83 stores computer program codes. When the computer program codes are executed by the processor 82, the following processing is performed.

For each VPN instance, the topology information and the bridging MAC address of the PE are sent to other PEs in the VPN instance via the network interface 81. The topology information and bridging MAC addresses received from the other PEs via the network interface 81. A CE MAC table in the VPN instance is generated according to the stored topology information and the bridging MAC addresses of all PEs. A unicast minimal spanning tree is calculated by taking the PE as a root and a unicast MAC table in the VPN instance is generated according to the unicast minimal spanning tree. one PE is selected as a root bridge, a broadcast minimal spanning tree is calculated by taking the root bridge as a root, and a broadcast MAC table in the VPN instance is generated according to the broadcast minimal spanning tree.

The topology information includes an identifier of each PW of the PE, a metric and a bridging MAC address of an opposite PE of each PW, an MAC address of each CE connected with the PE, and a local interface identifier of the CE.

According to an example, an item of the unicast MAC table includes a bridging MAC address of a destination PE, and egress port information. An item of the broadcast MAC table includes a node, a node type, and forwarding egress port information. An item of the CE MAC table includes a MAC address of a CE, a bridging MAC address of a destination PE or a local interface identifier.

The network interface further receives a unicast packet in the first VPN instance.

According to the codes in the storage 83, the following processing is performed.

when a unicast packet from a first CE connected with the PE in a first VPN instance is received from the network interface 81, a local CE MAC table in the first VPN instance is searched for a bridging MAC address of a destination PE corresponding to a destination MAC address in the unicast packet, and a local unicast MAC table in the first VPN instance is searched for egress port information corresponding to the bridging MAC address of the destination PE. Further, an outer layer MAC header is encapsulated for the unicast packet, and a source MAC address is a bridging MAC address of the PE and a destination MAC address is the bridging MAC address of the destination PE. Further, the unicast packet is sent according to the egress port information corresponding to the bridging MAC address of the destination PE.

According to the codes in the storage 83, the following processing is performed.

When the unicast packet in the first VPN is received from the network interface 81, and it is determined that the destination MAC address in the outer layer MAC header of the unicast packet is not a bridging MAC address of the PE, a local unicast MAC table in the first VPN instance is searched for egress port information corresponding to the destination MAC address, and the unicast packet is sent according to the egress port information corresponding to the destination MAC address. when the unicast packet in the first VPN instance is received from the network interface 81, and it is determined that the destination MAC address in the outer layer MAC header of the unicast packet is a bridging MAC address of the PE, the outer layer MAC header of the unicast packet is removed, a local CE MAC table in the first VPN instance is searched according to an inner layer destination MAC address, and the unicast packet is sent according to a local interface identifier searched out from the local CE MAC in the first VPN instance.

The network interface 81 is further to receive a broadcast packet, a multicast packet or an unknown unicast packet.

According to the codes in the storage 83, the following processing is performed.

When a broadcast packet, a multicast packet or an unknown unicast packet is received from a first CE connected with the PE in a first VPN instance via the network interface 81, if it is determined that the PE is not a root bridge of a broadcast minimal spanning tree, an outer layer MAC header is encapsulated for the packet, a destination MAC address is a bridging MAC address of the root bridge. In addition, a local unicast MAC table in the first VPN instance is searched for egress port information corresponding to the bridging MAC address of the root bridge, and the packet is sent according to the egress port information corresponding to the bridging MAC address of the root bridge.

According to the codes in the storage 83, the following processing is performed.

When the packet is received from the network interface 81, and it is determined that the destination MAC address in the outer layer MAC header of the packet is a bridging MAC address of the PE, the outer layer MAC header is removed, and it is determined that an inner layer destination MAC address is a broadcast address, a multicast address or an unknown unicast address, and it is determined that the PE is the root bridge of the broadcast minimal spanning tree. Then, a local broadcast MAC table in the first VPN instance is searched, and an outer layer MAC header is re-encapsulated, a destination MAC address is the broadcast address, the multicast address or the unknown unicast address. The packet is sent according to forwarding egress port information corresponding to the root bridge in the local broadcast MAC table in the first VPN instance.

When the packet is received from the network interface 81, if it is determined that the destination MAC address in the outer layer MAC header of the packet is the broadcast address, the multicast address or the unknown unicast address, and it is determined the PE is a middle node of the broadcast minimal spanning tree, the packet is sent according to egress port information corresponding to the PE in a local broadcast MAC table in the first VPN instance.

When the packet is received from the network interface 81, if it is determined that the destination MAC address in the outer layer MAC header of the packet is the broadcast address, the multicast address or the unknown unicast address, and it is determined the PE is a leaf node of the broadcast minimal spanning tree, the outer layer MAC header is removed, and the packet is sent according to egress port information corresponding to the PE in a local broadcast MAC table in the first VPN instance.

The methods, modules and devices described herein may be implemented by hardware, machine-readable instructions or a combination of hardware and machine-readable instructions. Machine-readable instructions used in the examples disclosed herein may be stored in storage medium readable by multiple processors, such as hard drive, CD-ROM, DVD, compact disk, floppy disk, magnetic tape drive, RAM, ROM or other proper storage device. Or, at least part of the machine-readable instructions may be substituted by specific-purpose hardware, such as custom integrated circuits, gate array, FPGA, PLD and specific-purpose computers and so on.

Specifically, a system or apparatus having a storage medium that stores machine-readable program codes for implementing functions of any of the above examples and that may make the system or the apparatus (or CPU or MPU) read and execute the program codes stored in the storage medium.

In this situation, the program codes read from the storage medium may implement any one of the above examples, thus the program codes and the storage medium storing the program codes are part of the technical scheme.

The storage medium for providing the program codes may include floppy disk, hard drive, magneto-optical disk, compact disk (such as CD-ROM, CD-R, CD-RW, DVD-ROM, DVD-RAM, DVD-RW, DVD+RW), magnetic tape drive, Flash card, ROM and so on. Optionally, the program code may be downloaded from a server computer via a communication network.

It should be noted that, alternatively to the program codes being executed by a computer, at least part of the operations performed by the program codes may be implemented by an operation system running in a computer following instructions based on the program codes to realize a technical scheme of any of the above examples.

In addition, the program codes implemented from a storage medium are written in a storage in an extension board inserted in the computer or in a storage in an extension unit connected to the computer. In this example, a CPU in the extension board or the extension unit executes at least part of the operations according to the instructions based on the program codes to realize a technical scheme of any of the above examples.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

The invention claimed is:

1. A method for transmitting a packet in a Virtual Private LAN Service (VPLS) network comprising:
    sending, by a first Provider Edge (PE) in a VPN instance, topology information and a bridging Media Access Control (MAC) address of the first PE to another PE in said VPN instance;
    receiving and storing topology information and bridging MAC addresses from the another PE;
    generating, by the first PE, a Customer Edge (CE) MAC table in the VPN instance according to the stored topology information and the bridging MAC addresses of the another PE;
    calculating a unicast minimal spanning tree by taking the first PE as a root, generating a unicast MAC table in the VPN instance according to the unicast minimal spanning tree;
    selecting one of the PEs in the VPN instance as a root bridge;
    calculating a broadcast minimal spanning tree by taking the root bridge as a root, and generating a broadcast MAC table in the VPN instance according to the broadcast minimal spanning tree.

2. The method of claim 1, wherein there are a plurality of VPN instances and the method of claim 1, is performed for each VPN instance.

3. The method of claim 1, wherein there are a plurality of other PEs in the VPN instance, the first PE sends topology information and the bridging MAC address of the first PE to the plurality of other PEs, and the first PE receives and stores topology information and bridging MAC addresses of the plurality of other PEs.

4. The method of claim 1, wherein
    an item of the unicast MAC table comprises a bridging MAC address of a destination PE, and egress port information;
    an item of the broadcast MAC table comprises a node, a node type, and forwarding egress port information;
    an item of the CE MAC table comprises a MAC address of a CE, a bridging MAC address of a destination PE or a local interface identifier.

5. The method of claim 1, further comprising:
    sending, by the first PE, new topology information to another PE in the VPN instance, when detecting that topology information of the first PE changes.

6. The method of claim 1, after generating the unicast MAC table in the VPN instance, further comprising:
    when the first PE receives a unicast packet from a first CE connected with the first PE in a first VPN instance,
    searching, by the first PE, a local CE MAC table in the first VPN instance for a bridging MAC address of a destination PE corresponding to a destination MAC address in the unicast packet;

searching, by the first PE, a local unicast MAC table in the first VPN instance for egress port information corresponding to the bridging MAC address of the destination PE;

encapsulating, by the first PE, an outer layer MAC header for the unicast packet, a source MAC address being a bridging MAC address of the first PE and a destination MAC address being the bridging MAC address of the destination PE; and sending, by the first PE, the unicast packet according to the egress port information corresponding to the bridging MAC address of the destination PE.

7. The method of claim 1, after generating the broadcast MAC table in the VPN instance, further comprising:

when the first PE receives a packet from a first CE connected with the first PE in a first VPN instance and determines the packet is a broadcast packet, a multicast packet or an unknown unicast packet, if it is determined that the first PE is not a root bridge of a broadcast minimal spanning tree;

encapsulating, by the first PE, an outer layer MAC header for the packet, a destination MAC address being a bridging MAC address of the root bridge;

searching, by the first PE, a local unicast MAC table in the first VPN instance for egress port information corresponding to the bridging MAC address of the root bridge; and sending, by the first PE, the packet according to the egress port information corresponding to the bridging MAC address of the root bridge.

8. The method of claim 1, wherein sending, by the first PE in the VPN instance, the topology information and the bridging MAC address of the first PE to the another PE in the VPN instance comprises:

sending, by the first PE in the VPN instance, the topology information and the bridging MAC address of the first PE to the another PE in the VPN instance via a Generic Associated Channel (G-Ach) of each PW of the first PE;

the topology information comprises: an identifier of each PW of the first PE, a metric and a bridging MAC address of an opposite PE of each PW, an MAC address of each CE connected with the first PE, and a local interface identifier of the CE.

9. The method of claim 1, wherein calculating the unicast minimal spanning tree by taking the first PE as the root comprises: calculating the unicast minimal spanning tree by taking the first PE as the root according to a Short Path First (SPF) algorithm;

selecting one of the PEs in the VPN instance as the root bridge comprises:

selecting one of the PEs in the VPN instance as the root bridge according to a spanning tree protocol algorithm.

10. A Provider Edge (PE) for use in a Virtual Private LAN Service (VPLS) network; the PE comprising:

a topology distributing module, to send topology information and a bridging Media Access Control (MAC) address of the PE to another PE in the VPN instance; receive and store topology information and bridging MAC addresses from the another PE;

a table learning module, to generate a Customer Edge (CE) MAC table in the VPN instance according to the stored topology information and the bridging MAC addresses of the another PE; calculate a unicast minimal spanning tree by taking the PE as a root, generate a unicast MAC table in the VPN instance according to the unicast minimal spanning tree; select one of the PEs in the VPN instance as a root bridge; calculate a broadcast minimal spanning tree by taking the root bridge as a root, and generate a broadcast MAC table in the VPN instance according to the broadcast minimal spanning tree.

11. The PE of claim 10, wherein, in the table learning module, an item of the unicast MAC table comprises a bridging MAC address of a destination PE, and egress port information;

an item of the broadcast MAC table comprises a node, a node type, and forwarding egress port information;

an item of the CE MAC table comprises a MAC address of a CE, a bridging MAC address of a destination PE or a local interface identifier.

12. The PE of claim 10, wherein the topology distributing module is further to send new topology information to another PE in the VPN instance, when detecting that topology information of the PE changes.

13. The PE of claim 10, wherein the PE further comprises a forwarding module; and the forwarding module is to, when receiving a unicast packet from a first CE connected with the PE in a first VPN instance, search a CE MAC table in the first VPN instance stored by the table learning module for a bridging MAC address of a destination PE corresponding to a destination MAC address in the unicast packet;

search a unicast MAC table in the first VPN instance stored by the table learning module for egress port information corresponding to the bridging MAC address of the destination PE;

encapsulate an outer layer MAC header for the unicast packet, a destination MAC address being the bridging MAC address of the destination PE; and send the unicast packet according to the egress port information corresponding to the bridging MAC address of the destination PE.

14. The PE of claim 10, wherein the forwarding module is further to when receiving a packet from a first CE connected with the PE in a first VPN instance and determining the packet is a broadcast packet, a multicast packet or an unknown unicast packet, if it is determined that the PE is not a root bridge of a broadcast minimal spanning tree;

encapsulate an outer layer MAC header for the packet, a destination MAC address being a bridging MAC address of the root bridge;

search a unicast MAC table in the first VPN instance stored by the table learning module for egress port information corresponding to the bridging MAC address of the root bridge; and send the packet according to the egress port information corresponding to the bridging MAC address of the root bridge.

15. A method for transmitting a packet in a Virtual Private LAN Service (VPLS) network comprising:

receiving, by a first Network-facing Provider Edge (NPE), a unicast packet transmitted by a first Customer Edge (CE) connected with the first NPE in a Virtual Private Network (VPN) instance, the unicast packet having a destination Media Access Control (MAC) address that is a MAC address of a second CE connected with a second NPE;

searching, by the first NPE, a local CE MAC table in the VPN instance for destination PE information corresponding to the destination MAC address of the unicast packet;

searching, by the first NPE, a local unicast MAC table in the VPN instance for egress port information corresponding to the destination PE information;

encapsulating, by the first NPE, an outer layer MAC header of the unicast packet with a source MAC address being a bridging MAC address of the first NPE and a destination MAC address being the searching destination PE information; and transmitting the unicast packet with the outer layer MAC header to a third NPE between the first NPE and the second NPE in the VPN instance according to the searched egress port information.

16. The method of claim 15, wherein the destination PE information includes a bridging MAC address of the second NPE.

17. The method of claim 15, comprising:

determining, by the third NPE, that the destination MAC address encapsulated in the outer layer MAC header of the unicast packet is not a bridging MAC address of the third NPE;

searching, by the third NPE, a local unicast MAC table in the VPN instance for egress port information corresponding to the destination MAC address; and transmitting, by the third NPE, the unicast packet with the outer layer MAC header to the second NPE according to the egress port information searched by the third NPE.

18. The method of claim 17, comprising:

receiving, by the second NPE, the unicast packet with the outer layer MAC header from the third NPE; and determining, by the second NPE, that the destination MAC address in the outer layer MAC header of the unicast packet is a bridging MAC address of the second NPE.

19. The method of claim 18, comprising:

removing, by the second NPE in response to determining that the destination MAC address in the outer layer MAC header of the unicast packet is a bridging MAC address of the second NPE, the outer layer MAC header of the unicast packet; and searching, by the second NPE, the local CE MAC table in the first VPN instance for a local interface identifier according to an inner layer destination MAC address of the unicast packet.

20. The method of claim 19, comprising:

transmitting, by the second NPE, the unicast packet to the second CD according to the searched local interface identifier.

\* \* \* \* \*